(12) United States Patent
Koide et al.

(10) Patent No.: US 9,505,395 B2
(45) Date of Patent: Nov. 29, 2016

(54) INDUSTRIAL VEHICLE

(71) Applicant: KABUSHIKI KAISHA TOYOTA JIDOSHOKKI, Kariya-shi, Aichi-ken (JP)

(72) Inventors: Yukikazu Koide, Aichi-ken (JP); Norihiko Kato, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 14/487,623

(22) Filed: Sep. 16, 2014

(65) Prior Publication Data
US 2015/0080176 A1 Mar. 19, 2015

(30) Foreign Application Priority Data

Sep. 18, 2013 (JP) ................. 2013-193350

(51) Int. Cl.
| | |
|---|---|
| *B60W 10/06* | (2006.01) |
| *B66F 9/20* | (2006.01) |
| *F02D 29/00* | (2006.01) |
| *F02D 41/02* | (2006.01) |

(Continued)

(52) U.S. Cl.
CPC .............. *B60W 10/06* (2013.01); *B60W 10/02* (2013.01); *B66F 9/07572* (2013.01); *B66F 9/20* (2013.01); *F02D 41/021* (2013.01); *B60W 2300/121* (2013.01); *B60W 2300/154* (2013.01); *B60W 2300/17* (2013.01); *B60W 2520/10* (2013.01); *B60W 2540/10* (2013.01); *B60W 2710/0666* (2013.01); *F02D 29/00* (2013.01); *F02D 2200/501* (2013.01); *F02D 2200/602* (2013.01); *F02D 2250/26* (2013.01); *Y10T 477/6403* (2015.01)

(58) Field of Classification Search
None
See application file for complete search history.

(56) References Cited

U.S. PATENT DOCUMENTS

| | | | |
|---|---|---|---|
| 2011/0308879 A1 | 12/2011 | Shirao et al. | |
| 2013/0073152 A1 | 3/2013 | Harada et al. | |
| 2015/0094936 A1* | 4/2015 | Koide | F02D 28/00 |
| | | | 701/110 |

FOREIGN PATENT DOCUMENTS

| | | | |
|---|---|---|---|
| EP | 1 666 711 A1 | | 6/2006 |
| EP | 2 211 042 A1 | | 7/2010 |
| EP | 2568148 | * | 3/2013 |

(Continued)

OTHER PUBLICATIONS

Extended European Search Report dated Mar. 25, 2015, issued by the European Patent Office in counterpart European application No. 14185070.1.

(Continued)

*Primary Examiner* — Colby M Hansen
(74) *Attorney, Agent, or Firm* — Sughrue Mion, PLLC

(57) ABSTRACT

An industrial vehicle includes an accelerator, an accelerator opening sensor which detects an opening of the accelerator, a loading unit, an engine and a torque restriction releasing unit. When the torque restriction releasing unit is set in an Eco-mode in which torque of the engine is restricted, if the opening of the accelerator detected by the accelerator opening sensor is a first predetermined value or greater and at least one of conditions that a speed of the vehicle is a second predetermined value or greater and that the loading unit is in a lifting operation, is satisfied and such conditions of the accelerator and the vehicle speed and/or lifting operation are continued for a predetermined period of time, the torque restriction releasing unit releases the torque restriction.

2 Claims, 2 Drawing Sheets

(51) Int. Cl.
  *B66F 9/075*   (2006.01)
  *B60W 10/02*   (2006.01)

(56) References Cited

FOREIGN PATENT DOCUMENTS

| EP | 2568148 A1 | 3/2013 |
|---|---|---|
| JP | 2008-105532 A | 5/2008 |
| WO | 2011/115290 A1 | 9/2011 |
| WO | WO2011/138880 * | 11/2011 |

OTHER PUBLICATIONS

Communication dated Mar. 27, 2015 from the European Patent Office in application No. 14186317.5.

* cited by examiner

TORQUE RESTRICTION RELEASING CONDITIONS

| CONDITION | REQUIREMENT |
|---|---|
| A1 | OPENING OF ACCELERATOR ≥ XA |
| A2 | VEHICLE SPEED ≥ YA OR LIFTING OPERATION |

TORQUE RESTRICTION RESUMING CONDITIONS

| CONDITION | REQUIREMENT |
|---|---|
| B1 | OPENING OF ACCELERATOR ≤ XB (< XA) |
| B2 | VEHICLE SPEED ≤ YB (< YA) |
| B3 | LIFTING OPERATION IS COMPLETED |

INDUSTRIAL VEHICLE

BACKGROUND OF THE INVENTION

The present invention relates to an engine-powered industrial vehicle.

A hybrid vehicle equipped with an Eco-mode (an economy mode) for the purpose of improving fuel efficiency has been proposed. By pressing the Eco-mode button, the vehicle is placed in the Eco-mode in which the output torque of the vehicle is restricted for energy saving, which leads to an efficient driving of engine. Such vehicle is disclosed in Japanese Unexamined Patent Application Publication No. 2008-105532.

This Publication discloses a hybrid vehicle in which, in the economy mode, torque is supplemented by the motor while the engine is being driven efficiently so as to maintain the vehicle performance for improvement of fuel efficiency. Unlike such a hybrid vehicle, in an engine type industrial vehicle having no traction motor, supplementing of torque using a motor cannot be performed. Improvement of fuel efficiency in an industrial vehicle, for example in a forklift truck, by restriction of the torque in the Eco-mode is difficult in that the range of the vehicle speed of the forklift truck is smaller as compared with that of an automobile and also that the weight of the vehicle varies significantly according to the load to be handled by the vehicle. If the torque restriction is continued in the Eco-mode, failure in loading operation may occur due to insufficient torque. For example, a vehicle traveling while carrying a heavy load may suffer from shortage of torque due to the heavy load and failure in achieving the maximum vehicle speed.

The present invention is directed to providing an industrial vehicle capable of providing a torque restriction control in an Eco-mode that permits both improvement of fuel efficiency and maximization of vehicle performance.

SUMMARY OF THE INVENTION

The present invention is directed to providing an industrial vehicle including an accelerator, an accelerator opening sensor which detects an opening of the accelerator, a loading unit, an engine and a torque restriction releasing unit. When the torque restriction releasing unit is set in an Eco-mode in which torque of the engine is restricted, if the opening of the accelerator detected by the accelerator opening sensor is a first predetermined value or greater and at least one of conditions that a speed of the vehicle is a second predetermined value or greater and that the loading unit is in a lifting operation, is satisfied and such conditions of the accelerator and the vehicle speed and/or lifting operation are continued for a predetermined period of time, the torque restriction releasing unit releases the torque restriction.

In accordance with an aspect of the present invention, when the torque restriction releasing unit is set in the Eco-mode, if the opening of the accelerator detected by the accelerator opening sensor is the first predetermined value or greater and at least one of the conditions that the vehicle speed is the second predetermined value or greater and that the loading unit is in the lifting operation, is satisfied and such conditions of the accelerator and the vehicle speed and/or lifting operation are continued for the predetermined period of time, the torque restriction is released. Thus, the torque restriction is released in the Eco-mode according to the state of vehicle. Therefore, the torque restriction control is performed in such a way that improvement of fuel efficiency and maximization of vehicle performance are achieved simultaneously.

According to the present invention, torque restriction control can be performed on the engine of an industrial vehicle in the Eco-mode according to the state of the vehicle while achieving both improvement of fuel efficiency and maximization of vehicle performance.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the embodiments together with the accompanying drawings in which:

DETAILED DESCRIPTION OF THE EMBODIMENTS

The following will describe an embodiment of an industrial vehicle according to the present invention with reference to the drawings.

Figure 1:
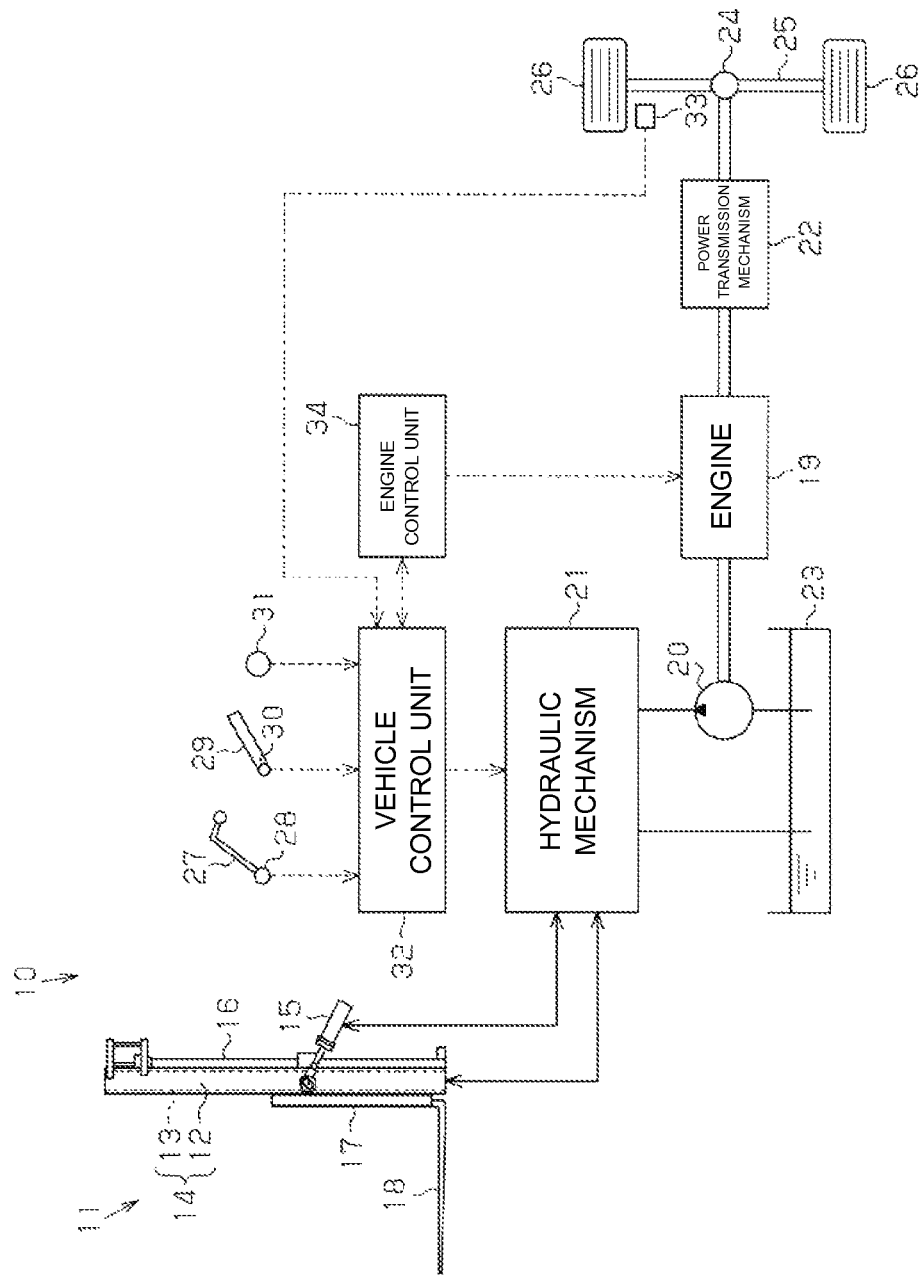
FIG. 1 is a schematic view showing an overall configuration of a forklift truck according to an embodiment of the present invention.

Referring to FIG. 1, numeral 10 designates a forklift truck including a loading unit 11. The loading unit 11 has a multi-stage mast assembly 14 including a pair of right and left outer masts 12 and a pair of inner masts 13. Each outer mast 12 is connected to a hydraulic tilt cylinder 15 and each inner mast 13 is connected to a hydraulic lift cylinder 16. The mast assembly 14 is tiltable in the forward and backward directions of the forklift truck 10 in response to hydraulic oil flowing into and out of the tilt cylinders 15. The inner masts 13 are movable upward and downward in the vertical direction of the forklift truck 10 in response to hydraulic oil flowing into and out of the lift cylinders 16. Forks 18 are mounted to the inner masts 13 via lift brackets 17. The inner masts 13 are raised and lowered along the outer masts 12 by the lift cylinders 16 and the forks 18 and the lift brackets 17 are raised and lowered accordingly.

The forklift truck 10 further includes an engine 19 that is a drive source for traveling and loading operation of the forklift truck 10, a hydraulic pump 20 that is driven by the engine 19, a hydraulic mechanism 21 to which hydraulic oil discharged from the hydraulic pump 20 is supplied and a power transmission mechanism 22. Output of the engine 19 is used as the drive force for traveling of the forklift truck 10 and also the drive force for operating the tilt cylinders 15 and the lift cylinders 16 for loading operation.

The hydraulic pump 20 is driven by the engine 19 to pump up hydraulic oil in an oil tank 23. The pumped oil is supplied to the tilt cylinders 15 and the lift cylinders 16 through the hydraulic mechanism 21 and, simultaneously, the hydraulic oil discharged from the tilt cylinders 15 and the lift cylinders 16 is returned to the oil tank 23 through the hydraulic mechanism 21. The hydraulic mechanism 21 has an electromagnetic control valve (not shown) which controls supply and discharge of the hydraulic oil to and from the tilt cylinders 15 and the lift cylinders 16.

The power transmission mechanism 22 has a mechanism for transmitting power of a torque converter and a clutch, neither being shown. The engine 19 is connected to the power transmission mechanism 22, which is in turn connected to a pair of drive wheels 26 via a differential gear 24 and an axle 25 having the drive wheels 26 mounted on the opposite ends thereof. Therefore, the output of the engine 19 is transmitted to the drive wheels 26 through the power transmission mechanism 22, the differential gear 24 and the axle 25.

Operation of the tilt cylinders 15 and the lift cylinders 16 is performed by operating a loading lever 27 which actually includes a tilt lever and a lift lever. Operation of the loading lever 27 is detected by a loading lever sensor 28. Acceleration of the forklift truck 10 is performed by depressing an accelerator pedal 29. The depression of the accelerator pedal 29 (or the opening of the accelerator pedal 29) is detected by an accelerator opening sensor 30. An Eco-mode switch 31 is provided at a position adjacent to the driver's seat side of the forklift truck 10.

The forklift truck 10 further includes a vehicle control unit 32. The vehicle control unit 32 is electrically connected to the loading lever sensor 28, the accelerator opening sensor 30, the Eco-mode switch 31 and a vehicle speed sensor 33. Based on the detection signals from the sensors 28, 30, 33 and the switch 31, the vehicle control unit 32 determines the operation of the loading lever 27, the depression of the accelerator pedal 29 (or the opening of the accelerator pedal 29), the vehicle speed and the Eco-mode switch 31 (ON or OFF position). For a desired loading operation, the vehicle control unit 32 controls the hydraulic mechanism 21 thereby to control the flow of hydraulic oil into and out from the tilt cylinders 15 and the lift cylinders 16.

The vehicle control unit 32 is connected to an engine control unit 34 which controls the engine 19.

The vehicle control unit 32 generates to the engine control unit 34 an instruction signal to control the speed of the engine 19. Specifically, for example, the number of rotations of the engine 19 is controlled in accordance with the operation amount of the accelerator pedal 29. The vehicle control unit 32 also generates to the engine control unit 34 a torque restriction instruction signal according to the position of the Eco-mode switch 31. Upon receipt of the torque restriction instruction signal, the engine control unit 34 controls the engine 19 so as to restrict the torque in the Eco-mode of operation.

The following will describe the operation of the forklift tuck 10.

The vehicle control unit 32 changes the values for torque restriction to be issued to the engine control unit 34 according to the ON or OFF position of the Eco-mode switch 31. In normal mode of operation, the engine 19 generates a full torque according to the opening of the accelerator pedal 29, while in the Eco-mode of operation, the torque is restricted and the engine 19 generates a torque that is reduced to approximately 80 percent of full torque in the normal mode to thereby suppress the consumption of fuel by the engine 19. It is to be noted that an optimum value is previously determined for the torque restriction taking the maximum load capacity, the specifications of the engine 19 and the nature of the task to be taken by the forklift truck 10 into account.

The vehicle control unit 32 determines the opening of the accelerator pedal 29, the operated position of the loading lever 27 and the vehicle speed of the forklift truck 10.

Figures 2A, 2B, 3:
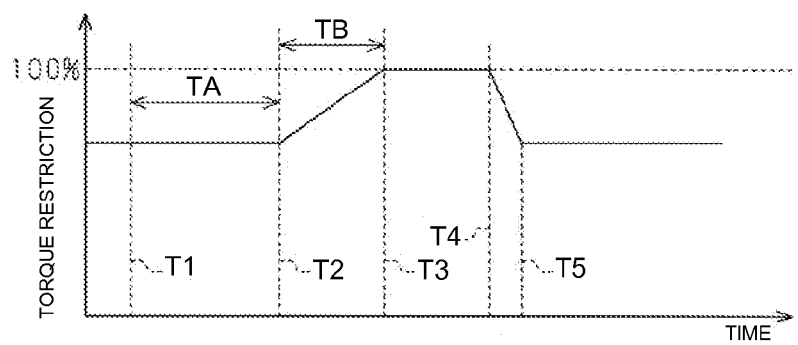
FIG. 2A is a table explaining the conditions for releasing a torque restriction in the forklift truck of FIG. 1.
FIG. 2B is a table explaining conditions for resuming the torque restriction in the forklift truck of FIG. 1.
FIG. 3 is a timing chart showing the operation of the forklift truck of FIG. 1.

The conditions A1 and A2 shown in FIG. 2A are previously set as the conditions for releasing the torque restriction.

In the table of FIG. 2A, the condition A1 is a condition associated with the opening of the accelerator pedal 29 in releasing the torque restriction. The condition A1 requires that the opening of the accelerator pedal 29 be a first predetermined value XA or greater. The value XA corresponds to the full opening of the accelerator pedal 29. In view of a free play of the accelerator pedal 29, the value XA may be 85% to 90% of opening of the accelerator pedal 29 which is fully, or 100%, depressed.

The condition A2 in the table of FIG. 2 is a condition associated with the vehicle speed and the loading operation in releasing the torque restriction. The condition A2 requires that either the vehicle speed be a second predetermined value YA or greater or the loading unit 11 is in lifting operation. The condition A2 is used to determine whether the forklift truck 10 is traveling or the forklift truck 10 is lifting the forks 18 by extending the lift cylinders 16 (hereinafter this operation will be referred to as "lifting operation"). The value YA is previously set to approximately 1 to 5 km/h as the reference value for determining that the forklift truck 10 is traveling by the drive force of the engine 19 transmitted through the power transmission mechanism 22. The detection of the lifting operation is made by the detection of the loading lever 27 by the loading lever sensor 28.

The conditions B1, B2 and B3 shown in FIG. 2B are previously set as the conditions for resuming torque restriction after it has been once released (torque restriction resuming conditions).

The condition B1 in the table of FIG. 2B is a condition associated with the opening of the accelerator pedal 29 in resuming the torque restriction. The condition B1 requires that the opening of the accelerator pedal 29 be a third predetermined value XB or smaller. The value XB corresponds to the opening of the accelerator pedal 29 other than the full opening of the accelerator pedal 29, e.g. the position of the accelerator pedal 29 released from the fully depressed position. Therefore, the value XB is smaller than the value XA in the condition A1 and set to approximately 50% of the full opening of the accelerator pedal 29 as the value that enables detection of the above-described state without fail.

The condition B2 in the table of FIG. 2B is a condition associated with the vehicle speed in resuming the torque restriction. The condition B2 requires that vehicle speed of the forklift truck 10 be a fourth predetermined value YB or smaller. The value YB is previously set at as a threshold which is smaller than the value YA in the condition A2 and used for detecting based on the vehicle speed that an operation of stopping the forklift truck 10 has been made after the vehicle speed once reached the second predetermined value YA. Since forklift trucks are generally operated continuously without being completely stopped between tasks, the value YB is not set to 0 km/m representing a complete stop of the forklift truck 10, but to approximately 1 to 3 km/h with the accuracy of the vehicle speed sensor 33 taken into account.

The condition B3 shown in the table of FIG. 2B is a condition associated with the lifting operation in resuming the torque restriction. The condition B3 requires that the lifting operation be completed. A determination is made as to whether the lift has been raised completely or not based on the position of the lift lever operated.

It is to be noted that the respective predetermined values for the opening of the accelerator pedal 29 and the vehicle speed are specified for the reasons described above have been determined previously through experiments based on the maximum load capacity of the forklift truck 10 and the characteristics of the engine 19 to be mounted on the forklift truck 10.

FIG. 3 is a timing chart explaining the transition of the engine 19 from the state in which the torque of the engine 19 is suppressed or limited to be smaller than that in the normal mode of operation (hereinafter, such state will be referred to as the torque restriction state) to a state in which the torque is not restricted (hereinafter, the state is referred to as the torque non-restriction state), and then again to the torque restriction state.

In the timing chart of FIG. 3, it is assumed that the forklift truck 10 is in the torque restriction state until time T1.

If the conditions A1 and A2 in FIG. 2A are both satisfied at time T1 in FIG. 3 for a predetermined period of time TA, the vehicle control unit 32 as the torque restriction releasing unit of the present invention releases the torque restriction at time T2 shown in FIG. 3 by reducing the torque restriction gradually until the torque is restricted no more at T3. Specifically, the period of time TA between T1 and T2 is a predetermined period of time during which the torque restriction releasing conditions are satisfied.

The period of time TA is set for the purpose of preventing release of the torque restriction by transient satisfaction of the conditions A1 and A2. Specifically, the period of time TA is set approximately to 10 to 30 seconds as the value which allows the vehicle speed of the forklift truck 10 to reach its maximum in traveling on a flat road. The value TA has been determined previously through experiments based on the maximum load capacity of the forklift truck 10 and the characteristics of the engine 19 to be mounted on the forklift truck 10.

Transition from the torque restriction state to the torque non-restriction state is performed gradually and the transition to the torque non-restriction state is completed at time T3 in FIG. 3. Specifically, the period of time TB between T2 and T3 is the time during which transition is performed from the torque restriction state to the torque non-restriction state.

Thus, the forklift truck 10 enters the torque non-restriction state and the engine 19 generates a torque which is substantially same as that in the normal mode of operation. Accordingly, situations that a maximum vehicle speed or lifting operation cannot be achieved under a heavy load is avoided.

The following will describe the operation of the forklift truck 10 more in detail.

It is assumed that the Eco-mode switch 31 of the forklift truck 10 is tuned ON by an administrator to restrict the torque and lock the forklift truck 10 in the mode. An operator who is not authorized to change modes operates the forklift truck 10 in the Eco-mode with the torque restriction.

In the case of a diesel engine, the fuel injection is reduced by torque restriction, with the result that the output torque of the engine 19 is reduced. In the case of a gasoline engine, the opening of the throttle valve and hence the flow of air passing through the throttle valve is reduced and the output torque of the engine 19 is reduced, accordingly. Torque of the engine 19 is thus restricted according to the opening of the accelerator pedal 29 and the acceleration performance of the forklift truck 10 is restricted thereby to reduce the fuel consumption of the engine 19.

The vehicle speed or the loading speed may be controlled by adjusting the torque of the engine 19 (or the engine speed of the engine 19) through the depression of the accelerator pedal 29. If the condition A1 (the opening of the accelerator pedal 29 being XA or greater) and the condition A2 (the vehicle speed being YA or greater or the forklift truck 10 being in lifting operation) are kept satisfied for a predetermined duration of time TA, it is determined that the forklift truck 10 is either traveling or in lifting operation.

If the condition A1 that the opening of the accelerator pedal 29 is XA or greater and the condition A2 that the vehicle speed is YA or greater are kept satisfied for a predetermined duration of time, it is determined that the forklift truck 10 is traveling with the accelerator pedal 29 fully depressed, and if such state is continued for the predetermined period of time TA, the torque restriction is released by gradually reducing the torque restriction. For example, when the forklift truck 10 loaded with a heavy load is traveling in the Eco-mode, the maximum vehicle speed may not be achieved due to the insufficient torque. In such a case, however, the maximum performance of the forklift truck 10, that is, the maximum vehicle speed is obtained by releasing the torque restriction.

Setting the condition A1 that the opening of the accelerator pedal 29 is XA or greater in A1 and the condition A2 that the vehicle speed is YA or greater and also a condition that the conditions A1 and A2 are both satisfied for the predetermined period of time enables the torque restriction in the case that the forklift truck 10 is traveling with the accelerator pedal 29 fully depressed and with no heavy load, with the result that acceleration with restricted fuel consumption is achieved. Since the forklift truck 10 is carrying no heavy load, the maximum vehicle speed can be reached after lapse of the predetermined period of time even with the torque restriction.

Furthermore, thanks to the condition A2 that the vehicle speed is YA or greater in releasing the torque restriction, the torque restriction is not released even when the accelerator pedal 29 is fully depressed with the forklift truck 10 at a stop and no loading operation being performed.

If the condition A1 that the opening of the accelerator pedal 29 is XA or greater and the condition A2 that the lifting operation is being performed are both satisfied for the predetermined duration of time, the forklift truck 10 is in lifting operation at a stop with the accelerator pedal 29 fully depressed. If such state of the forklift truck 10 is continued for a predetermined period of time, the toque restriction is released by gradually reducing the torque restriction. For example, when the forklift truck 10 is lifting a heavy load in the Eco-mode, sufficient lifting speed may not be achieved due to insufficient output of the engine 19. During such lifting operation, however, the maximum vehicle performance and sufficient lifting speed are obtained by releasing the torque restriction.

In the period between T2 and T3 in FIG. 3, that is, the period during which the torque restriction state is gradually shifted to the torque non-restriction state, if, for example, the opening of the accelerator pedal 29 becomes zero (accelerator OFF), the forklift truck 10 returns to the torque restriction state.

The following will describe the operation for resuming the torque restriction.

In the diagram of FIG. 3, the forklift truck 10 in the period of time before time T4 is in the state in which the torque restriction is released.

If one of the conditions B1, B2 and B3 shown in FIG. 2B, which are the conditions for resuming torque restriction, is satisfied at time T4 in the diagram of FIG. 3, the vehicle control unit 32, which serves as the torque restriction resuming unit of the present invention, resumes the torque restriction again in a gradual manner. The resumption of the torque restriction is performed gradually over a period of time from time T4 to time T5 at which the resumption is completed. Thus, the forklift truck 10 returns to the torque restriction state.

With this setting, the forklift truck 10 returns from the torque non-restriction state to the torque restriction state that enables improvement of fuel efficiency.

The following will describe the operation for resuming the torque restriction more in detail.

In the condition B1, when the accelerator pedal 29 fully depressed in the condition A1 is released, the torque of the engine 19 drops, which means that the torque restriction does not need to be released. Thus, the forklift truck 10 returns to the torque restriction state. Specifically, if the condition B1 is satisfied, that is when the opening of the accelerator pedal 29 is reduced to XB or less, it is determined that the torque restriction needs to be resumed.

In the condition B2, when the forklift truck 10 in the state in which the torque restriction is released is being stopped, the vehicle control unit 32 returns the forklift truck 10 to the torque restriction state. A forklift truck 10 may be controlled to be stopped by depressing the brake pedal or the inching pedal with the accelerator pedal such as 29 kept in its fully-depressed position. Even in such case the engine torque with no torque restriction is required and the vehicle control unit 32 returns the forklift truck 10 to the torque restriction state. Specifically, if the condition B2 is satisfied, that is when the vehicle speed is reduced from YA or greater to YB or less, it is determined that the torque restriction needs to be resumed.

With this setting, the torque is restricted when accelerating the forklift truck 10 again after the vehicle speed has been dropped to YB or less.

If the condition B3 is satisfied, or when the lifting operation is completed, engine torque for the lifting operation is not required any more and, therefore, release of the torque restriction is not required any more. Thus, the vehicle control unit 32 returns the forklift truck 10 to the state in which the torque is restricted. Specifically, by detecting that the lift lever is returned to the neutral position, it is determined that the torque restriction needs to be resumed.

The above-described embodiment of the industrial vehicle offers the following effects:

(1) When the mode of operation of the forklift truck 10 is locked to the Eco-mode and the operator cannot cancel the mode, the forklift truck 10 appropriately releases the torque restriction and also resumes the torque restriction for the purpose of improving the fuel efficiency. Additionally, the detection of the traveling condition and the state of loading operation of the forklift truck 10 makes possible controlling of the torque restriction in view of the manner of operation that is specific to a forklift truck. In other words, the improvement of the fuel efficiency of the engine type forklift truck 10 can be accomplished with no increase in cost. During the traveling, the forklift truck 10 can achieve the maximum vehicle speed regardless of the presence of a load while improving the fuel efficiency. This is true for the case when the forklift truck 10 is in loading operation. When the forklift truck 10 is in a pushing operation, the maximum drive torque is achieved and maintained while improving the fuel efficiency.

(2) The engine type forklift truck 10 has the accelerator opening sensor 30 and the vehicle control unit 32. In the state that the forklift truck 10 is in the torque restriction state, when the opening of the accelerator pedal 29 is XA or greater, either the vehicle speed is YA or greater or the forklift truck 10 is in the lifting operation and such conditions are continued for the predetermined period of time TA, the vehicle control unit 32 releases the torque restriction. Thus, the torque restriction is released when a high torque is required for any specific operation of the forklift truck 10. By using the Eco-mode, the torque restriction is released according to the state of the forklift truck 10, so that the torque controlling is performed in such a way that improvement of the fuel efficiency and the maximum vehicle working performance are achieved simultaneously.

(3) As mentioned above, the torque restriction is released when the conditions of the opening of the accelerator pedal 29 being XA or greater and the vehicle speed being YA or greater are continued for the predetermined time TA. According to such controlling of the torque restriction, the maximum vehicle speed is achieved and the torque restriction of the forklift truck 10, which is not in loading operation and the forklift thereof is not moving, is not released due to an operation with the accelerator pedal 29 fully depressed for a predetermined period of time.

(4) As mentioned above, if the conditions of the opening of the accelerator pedal 29 being XA or greater and the forklift truck 10 being in the lifting operation are satisfied for the predetermined period of time, the torque restriction is released and, therefore, sufficient lifting speed is achieved.

(5) If it is detected after the release of the torque restriction that the opening of the accelerator pedal 29 is XB or smaller, the vehicle speed is YB (which is smaller than YA) or smaller and the lift has been raised completely, the torque restriction is resumed. Such torque restriction controlling makes the torque restriction to be is resumed easily from the torque non-restriction state. In other words, the torque restriction becomes effective again according to the state of the forklift truck 10. Therefore, the fuel efficiency can be improved by using the Eco-mode operation of the forklift truck 10.

(6) The opening of the accelerator pedal 29 in (5) above that is XB or smaller is a condition for the resumption of the torque restriction. Thus, the resumption of the torque restriction can be accomplished rapidly.

(7) The torque restriction once released when the vehicle speed in (5) above becomes YA or smaller can be resumed if the vehicle speed becomes YB or greater.

(8) With regard to the detection of the completion of the lifting operation, if it is detected that the lifting operation is completed, application of a torque limit is resumed. The resumption of the torque restriction may be accomplished if the lifting operation is completed.

(9) The release of torque restriction is performed by gradually reducing the torque restriction, so that the forklift truck operator will not suffer from an uncomfortable feel, such as an abrupt start, due to an irregular change of the torque. In other words, the torque restriction is released without giving an uncomfortable feel to the operator (driver) of the forklift truck 10.

The present invention is not limited to the above embodiment, but it may be embodied in various ways as exemplified in the following.

In the above-described embodiment, the lifting motion of the forks 18 by the lift cylinders 16 (lifting operation) is monitored for determination of the conditions A2 and B3, respectively. According to the present invention, however, the rearward tilting motion of the mast assembly 14 by the tilt cylinders 15 (rearward tilting) may be monitored through detection of the position of a tilt lever of the forklift truck 10. Alternatively, the forklift truck 10 of the present invention may be equipped with an implement and the motion of the implement by hydraulic cylinders may be monitored.

The control value of the hydraulic mechanism 21 is of an electromagnetic type and its operation is controlled based on electrical signals from the vehicle control unit 32. However, such electromagnetic control valve may be replaced by a mechanical valve. Specifically, various operation parts may be connected to the control valve so that the open and closed state is switched by operating such operation parts.

The power transmission mechanism 22 may use either a torque converter or a manual transmission.

The torque restriction control in the above-described embodiment may be applied to industrial vehicles other than forklift trucks, which are equipped with implements such as a bucket.

What is claimed is:

1. An industrial vehicle, comprising:
    an accelerator;
    an accelerator opening sensor which detects an opening of the accelerator;
    a loading unit which is operated by a loading lever;
    a loading lever sensor which detects an operation of the loading lever;
    an engine;
    an engine control unit which controls the engine;
    an economy mode switch configured to set an economy mode in which an output torque of the engine is reduced as compared to when the economy mode is not set; and
    a vehicle control unit including instructions which when executed perform:
    when the economy mode is set, generates a torque restriction instruction signal to the engine control unit to restrict the output torque of the engine,
    based upon the opening of the accelerator detected by the accelerator opening sensor being equal to or greater than a first predetermined value for a predetermined period of time and at least one of the following conditions is satisfied for the predetermined period of time: (i) a speed of the vehicle is equal to or greater than a second predetermined value or (ii) the loading unit is determined to be in a lifting operation by the loading lever sensor, generates a torque restriction release signal to the engine control unit to release the torque restriction of the output torque of the engine, and
    after the torque restriction is released by the vehicle control unit, and based upon detection by the vehicle control unit that at least one of the following conditions is satisfied (i) the opening of the accelerator detected by the accelerator opening sensor is a third predetermined value or smaller, (ii) a speed of the vehicle is a predetermined threshold or smaller, the threshold unit is completed, generates the torque restriction instruction signal to the engine control unit to restrict the output of the engine.

2. The industrial vehicle according to claim 1, wherein the engine control unit releases the torque restriction by gradually reducing the torque restriction of the output torque of the engine.

* * * * *